US009286762B2

(12) United States Patent
George et al.

(10) Patent No.: US 9,286,762 B2
(45) Date of Patent: *Mar. 15, 2016

(54) SYSTEM AND METHOD FOR OPERATING A MATCHING GAME IN CONJUNCTION WITH A TRANSACTION ON A GAMING MACHINE

(71) Applicant: Konami Gaming, Inc., Las Vegas, NV (US)

(72) Inventors: Jeffrey George, Las Vegas, NV (US); Edward Sepich, Henderson, NV (US); Thomas E. Soukup, Las Vegas, NV (US); Steve Sutherland, Henderson, NV (US)

(73) Assignee: KONAMI GAMING, INC., Las Vegas, NV (US)

( * ) Notice: Subject to any disclaimer, the term of this patent is extended or adjusted under 35 U.S.C. 154(b) by 120 days.

This patent is subject to a terminal disclaimer.

(21) Appl. No.: 14/243,733

(22) Filed: Apr. 2, 2014

(65) Prior Publication Data

US 2014/0256396 A1 Sep. 11, 2014

Related U.S. Application Data

(63) Continuation of application No. 11/779,537, filed on Jul. 18, 2007, now Pat. No. 8,727,854, which is a continuation-in-part of application No. 11/276,312, filed on Feb. 23, 2006, now abandoned.

(60) Provisional application No. 60/807,982, filed on Jul. 21, 2006, provisional application No. 60/863,639, filed on Oct. 31, 2006.

(51) Int. Cl.
*A63F 9/24* (2006.01)
*A63F 13/00* (2014.01)
(Continued)

(52) U.S. Cl.
CPC ............ *G07F 17/3286* (2013.01); *G07F 17/32* (2013.01)

(58) Field of Classification Search
USPC .................................. 463/16, 17, 21, 25, 42
See application file for complete search history.

(56) References Cited

U.S. PATENT DOCUMENTS 4,283,709 A 8/1981 Lucero et al.
4,339,798 A 7/1982 Hedges et al.
(Continued)

FOREIGN PATENT DOCUMENTS

WO 01/33442 A1 5/2001
WO 01/33478 A1 5/2001
(Continued)

OTHER PUBLICATIONS

International Search Report and Written Opinion (PCT/US2007/016456)—Date of Mailing: Nov. 19, 2007.

*Primary Examiner* — Kevin Y Kim
(74) *Attorney, Agent, or Firm* — Howard & Howard Attorneys PLLC

(57) ABSTRACT

A matching game is triggered for play by a plurality of players while the players are performing a transaction. A matching rule is established for playing the matching game and a jackpot pool is established for awarding prizes to the players. The players are allowed to initiate a session by logging onto a gaming machine to perform the transaction and the players are identified. A selected set of symbols are established for each player and a match set of symbols are generated. The matching game is triggered in response to a predetermined trigger where only the players in the current session are eligible for the matching game. The match set of symbols are compared against each selected set of symbols. The prize is responsively awarded from the jackpot pool to each player whose selected set of symbols satisfies the matching rule.

20 Claims, 5 Drawing Sheets

(51) Int. Cl.

| | |
|---|---|
| ***G06F 17/00*** | (2006.01) |
| ***G06F 19/00*** | (2011.01) |
| ***G07F 17/32*** | (2006.01) |

(56) References Cited

U.S. PATENT DOCUMENTS

| | | | |
|---|---|---|---|
| 4,582,324 | A | 4/1986 | Koza et al. |
| 4,636,951 | A | 1/1987 | Harlick |
| 4,652,998 | A | 3/1987 | Koza et al. |
| 4,782,468 | A | 11/1988 | Jones et al. |
| 4,948,138 | A | 8/1990 | Pease et al. |
| 5,038,022 | A | 8/1991 | Lucero |
| 5,116,055 | A | 5/1992 | Tracy |
| 5,249,800 | A | 10/1993 | Hilgrndorf et al. |
| 5,265,874 | A | 11/1993 | Dickinson et al. |
| 5,280,909 | A | 1/1994 | Tracy |
| 5,321,241 | A | 6/1994 | Craine |
| 5,332,076 | A | 7/1994 | Ziegret |
| 5,342,047 | A | 8/1994 | Heidel et al. |
| 5,429,361 | A | 7/1995 | Raven et al. |
| 5,457,306 | A | 10/1995 | Lucero |
| 5,470,079 | A | 11/1995 | LeStrang et al. |
| 5,472,194 | A | 12/1995 | Breeding et al. |
| 5,547,202 | A | 8/1996 | Tsumura |
| 5,559,312 | A | 9/1996 | Lucero |
| 5,564,700 | A | 10/1996 | Celora |
| 5,611,730 | A | 3/1997 | Weiss |
| 5,655,961 | A | 8/1997 | Acers et al. |
| 5,655,966 | A | 8/1997 | Werdin, Jr. et al. |
| 5,674,128 | A | 10/1997 | Holch et al. |
| 5,702,304 | A | 12/1997 | Acres et al. |
| 5,707,287 | A | 1/1998 | McCrea, Jr. |
| 5,735,525 | A | 4/1998 | McCrea, Jr. |
| 5,741,183 | A | 4/1998 | Acres et al. |
| 5,752,882 | A | 5/1998 | Acres et al. |
| 5,762,552 | A | 6/1998 | Vuong et al. |
| 5,766,076 | A | 6/1998 | Pease et al. |
| 5,770,533 | A | 6/1998 | Franchi |
| 5,800,268 | A | 9/1998 | Molnick |
| 5,800,269 | A | 9/1998 | Holch et al. |
| 5,811,772 | A | 9/1998 | Lucero |
| 5,816,918 | A | 10/1998 | Kelly et al. |
| 5,820,459 | A | 10/1998 | Acres et al. |
| 5,836,817 | A | 11/1998 | Acres et al. |
| 5,851,149 | A | 12/1998 | Yidos et al. |
| 5,855,515 | A | 1/1999 | Pease et al. |
| 5,876,284 | A | 3/1999 | Acres et al. |
| 5,885,158 | A | 3/1999 | Torango et al. |
| 5,902,983 | A | 5/1999 | Crevelt et al. |
| 5,911,626 | A | 6/1999 | McCrea, Jr. |
| 5,919,091 | A | 7/1999 | Bell et al. |
| 5,935,004 | A | 8/1999 | Tarr et al. |
| 5,944,608 | A | 8/1999 | Reed et al. |
| 5,952,640 | A | 9/1999 | Lucero |
| 5,959,277 | A | 9/1999 | Lucero |
| 5,967,896 | A | 10/1999 | Jorasch et al. |
| 6,001,016 | A | 12/1999 | Walker et al. |
| 6,012,984 | A | 1/2000 | Roseman |
| 6,019,283 | A | 2/2000 | Lucero |
| 6,039,648 | A | 3/2000 | Guinn et al. |
| 6,048,269 | A | 4/2000 | Burns et al. |
| 6,068,552 | A | 5/2000 | Walker et al. |
| 6,071,190 | A | 6/2000 | Weiss et al. |
| 6,077,162 | A | 6/2000 | Weiss |
| 6,080,062 | A | 6/2000 | Olson |
| 6,089,982 | A | 7/2000 | Holch et al. |
| 6,093,100 | A | 7/2000 | Singer et al. |
| 6,093,103 | A | 7/2000 | McCrea, Jr. |
| 6,110,043 | A | 8/2000 | Olsen |
| 6,110,044 | A | 8/2000 | Stern |
| 6,117,011 | A | 9/2000 | Lvov |
| 6,117,012 | A | 9/2000 | McCrea, Jr. |
| 6,126,546 | A | 10/2000 | Reed et al. |
| 6,146,273 | A | 11/2000 | Olsen |
| 6,162,122 | A | 12/2000 | Acers et al. |
| 6,183,362 | B1 | 2/2001 | Boushy |
| 6,183,366 | B1 | 2/2001 | Goldberg et al. |
| 6,203,010 | B1 | 3/2001 | Jorasch et al. |
| 6,206,782 | B1 | 3/2001 | Walker et al. |
| 6,210,275 | B1 | 4/2001 | Olsen |
| 6,210,277 | B1 | 4/2001 | Stefan |
| 6,257,981 | B1 | 7/2001 | Acers et al. |
| 6,315,662 | B1 | 11/2001 | Jorasch et al. |
| 6,371,852 | B1 | 4/2002 | Acers |
| RE37,885 | E | 10/2002 | Acres et al. |
| 6,511,377 | B1 | 1/2003 | Weiss |
| 6,582,310 | B1 | 6/2003 | Walker et al. |
| 6,685,563 | B1 | 2/2004 | Meekins et al. |
| 6,719,632 | B2 | 4/2004 | Palmer et al. |
| 6,764,398 | B2 | 7/2004 | Stone et al. |
| 6,780,111 | B2 | 8/2004 | Cannon et al. |
| 2002/0013169 | A1 | 1/2002 | NewDelman |
| 2002/0039923 | A1 | 4/2002 | Cannon et al. |
| 2002/0055381 | A1 | 5/2002 | Tarantino |
| 2002/0142825 | A1 | 10/2002 | Lark et al. |
| 2002/0142846 | A1 | 10/2002 | Paulsen |
| 2002/0151357 | A1 | 10/2002 | Acers |
| 2002/0155887 | A1 | 10/2002 | Cris-Puszkicz |
| 2002/0165023 | A1 | 11/2002 | Brosnan et al. |
| 2002/0173354 | A1 | 11/2002 | Winans et al. |
| 2002/0177479 | A1 | 11/2002 | Walker et al. |
| 2002/0187825 | A1 | 12/2002 | Tracy et al. |
| 2003/0028480 | A1 | 2/2003 | Rowe |
| 2003/0054868 | A1 | 3/2003 | Paulsen et al. |
| 2003/0054881 | A1 | 3/2003 | Hedrick et al. |
| 2003/0064795 | A1 | 4/2003 | Baerlocher et al. |
| 2003/0073494 | A1 | 4/2003 | Kalpakian et al. |
| 2003/0087691 | A1 | 5/2003 | Kiely et al. |
| 2003/0114219 | A1 | 6/2003 | McClintic |
| 2003/0127793 | A1 | 7/2003 | Adams |
| 2003/0162579 | A1 | 8/2003 | Gauselmann |
| 2003/0186734 | A1 | 10/2003 | LeMay et al. |
| 2004/0235554 | A1 | 11/2004 | DeFrees-Parrott et al. |
| 2005/0037841 | A1 | 2/2005 | De Waal et al. |
| 2005/0049036 | A1 | 3/2005 | Mead |
| 2005/0049042 | A1 | 3/2005 | Walker et al. |
| 2005/0054413 | A1 | 3/2005 | Randall et al. |
| 2005/0059480 | A1 | 3/2005 | Soukup et al. |
| 2005/0119047 | A1 | 6/2005 | Olive |
| 2005/0187014 | A1 | 8/2005 | Saffari et al. |
| 2006/0046823 | A1 | 3/2006 | Kaminkow et al. |
| 2007/0218982 | A1 | 9/2007 | Baerlocher |

FOREIGN PATENT DOCUMENTS

| | | | |
|---|---|---|---|
| WO | 01/58546 | A1 | 8/2001 |
| WO | 01/83062 | A1 | 11/2001 |
| WO | 2004/038551 | A2 | 5/2004 |
| WO | 2004/111954 | A1 | 12/2004 |
| WO | 2004/114067 | A2 | 12/2004 |

SYSTEM AND METHOD FOR OPERATING A MATCHING GAME IN CONJUNCTION WITH A TRANSACTION ON A GAMING MACHINE

CROSS REFERENCE TO RELATED APPLICATIONS

This application is a continuation of U.S. patent application Ser. No. 11/779,537, filed Jul. 18, 2007, which is a continuation-in-part of U.S. patent application Ser. No. 11/276,312, filed Feb. 23, 2006, which claims benefit to U.S. Provisional Patent Application Ser. No. 60/807,982, filed on Jul. 21, 2006 and U.S. Provisional Patent Application Ser. No. 60/863,639, filed on Oct. 31, 2006, which are hereby incorporated by reference in their entirety.

FIELD OF THE INVENTION

The invention generally relates to a system and a method of operating a secondary game on a gaming machine. More specifically, the present invention relates to a system and a method of operating a secondary game while a player is playing a primary game on a gaming machine.

BACKGROUND OF THE INVENTION

The growth and competition in the casino gaming market in recent years and the increasingly sophisticated and complex technology being integrated into the gaming environment, at the individual game, casino management, and auditing levels, presents both challenges and opportunities to game manufacturers, gaming establishment operators, and regulatory agencies. The technological capabilities and requirements of, for example, advanced electronic games, multi-site gaming operations, detailed player tracking, wide area progressive jackpots, and various alternatives to the use of currency and coins by players, all present a potentially huge pool of ever-changing data which can be of great value to casino operators (from a management standpoint) and to regulators from an audit/compliance standpoint.

One area that has received a lot of attention in recent years has been providing added promotional incentives to players of gaming machines, such as video slot machines, video poker machines, etc. One type of promotional incentive is a "free play" award redeemable at the gaming machine and is typically based on a player's previous level of play. Casino marketing spends great amounts of time, segmenting players into groups to determine what amount of "free play" to preload into the player tracking system so when the player plays they can redeem their "free play" award at the gaming device.

Players may also be given a promotional incentive through a player tracking club. Usually, a player is identified during play by a player tracking ID card and/or a player identification number. The player tracking system tracks the player's play and awards player tracking points according to established criteria. The player tracking points may be redeemed for prizes, such as complimentary meals or merchandise. Again, this type of manual promotional incentive is casino resource intensive. Another type of incentive is given through an automated progressive jackpot award. A progressive jackpot award is a constantly accumulating award based on coin or credit-in, i.e., the tokens played by players, on a plurality of predetermined gaming machines, such as slot or video slot machines. The progressive jackpot award has a minimum value and increases until some maximum value. The progressive jackpot award is awarded to the player under some predetermined conditions. Additionally, the awarding of the progressive jackpot may also trigger a set amount of "free play" incentives to all non-jackpot players playing at gaming machines at the time that the progressive jackpot is hit.

However, these systems do not provide incentives in the form of interesting secondary games to further encourage players to play the gaming machines. Moreover, these systems require manual intervention and consume vast casino resources to maintain and operate.

The present invention is aimed at one or more of the problems as set forth above.

SUMMARY OF THE INVENTION

In a first aspect, the invention provides a method of operating a matching game for play by a plurality of players which is triggered while the plurality of players are performing a transaction. The method comprising the steps of establishing a matching rule for playing the matching game, establishing one or more jackpot pools for awarding prizes to the players, identifying the players, allowing each player to initiate a session by logging onto a gaming machine to perform the transaction, establishing a selected set of symbols for each player, generating a match set of symbols, initiating the matching game in response to a predetermined trigger where only the players in the current session are eligible for the matching game, comparing the match set of symbols against each selected set of symbols, and responsively awarding the prize from one or more jackpot pools to each player whose selected set of symbols satisfies the matching rule.

In a second aspect, the invention provides a system for operating a matching game for play by a plurality of players which is triggered while the plurality of players are performing a transaction. The system comprises a plurality of gaming machines allowing each of the respective players to initiate a session by logging onto one of the gaming machines to perform the transaction while initiating the matching game for each of the respective players in response to a predetermined trigger and an accumulator responsive to play at each of the gaming machines by the plurality of players to establish a jackpot for awarding prizes to the players. The system also comprises a host computer in communication with each of the gaming machines and the accumulator with the host computer establishing a matching rule for playing the matching game, identifying the players logged on to each of the plurality of gaming machines, establishing a selected set of symbols for each player, generating a match set of symbols, comparing the match set of symbols against each selected set of symbols, and responsively awarding the prize from a plurality of jackpot pools to each player whose selected set of symbols satisfies the matching rule.

In a third aspect, the invention provides a method of operating a game for play by a plurality of players. The method comprising the steps of operating a transaction for play by the plurality of players, allowing each player to initiate a session by logging onto a gaming machine to perform the transaction, triggering a secondary game for play by the plurality of players that are performing the transaction, establishing a rule for playing the secondary game, establishing one or more jackpot pools for awarding prizes to the players, identifying the players, initiating the secondary game in response to a predetermined trigger where only the players in the current session are eligible for the secondary game, and responsively awarding the prize from the one or more jackpot pools to each player who satisfies the rule.

In a fourth aspect, the invention provides a system for operating a game for play by a plurality of players. The system comprises a plurality of gaming machines allowing each of the respective players to initiate a session by logging onto one of the gaming machines to perform a transaction while initiating a secondary game for each of the respective players performing the transaction in response to a predetermined trigger and an accumulator responsive to play at each of the gaming machines by the plurality of players to establish one or more jackpot pools for awarding prizes to the players playing the secondary game. The system also comprises a host computer in communication with each of the gaming machines and the accumulator with the host computer establishing a rule for playing the secondary game, identifying the players logged on to each of the plurality of gaming machines, and responsively awarding the prize from of the one or more jackpot pools to each player who satisfies the matching rule.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
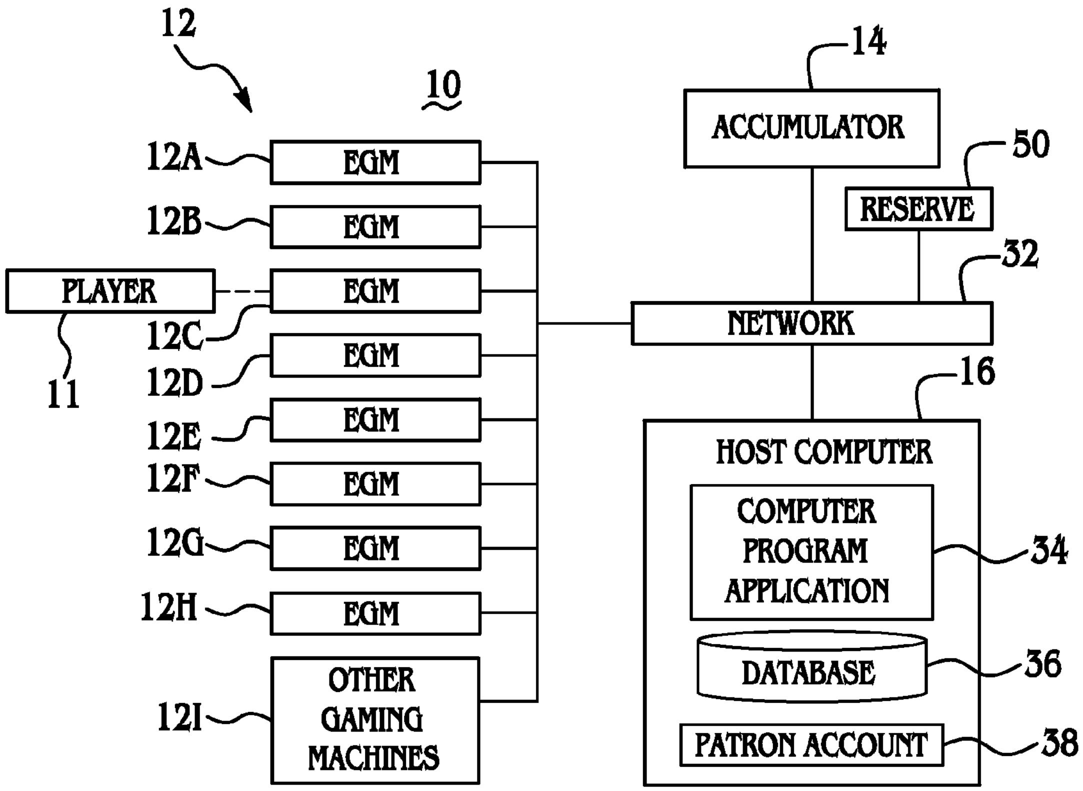
FIG. 1 is a block diagram of a system for allowing a player to interface with a gaming machine.

The present invention is a system for operating a secondary game for play by a plurality of players 11. The system is shown generally at 10 in FIG. 1. In one aspect, the secondary game is triggered while the plurality of players 11 are performing a transaction on a respective gaming machine 12. The system 10 includes a plurality of the gaming machines 12, an accumulator 14, a reserve 50, and a host computer 16 in communication with each of the gaming machines 12, the accumulators 14 and the reserve 50.

Gaming Machines

Figure 1A:
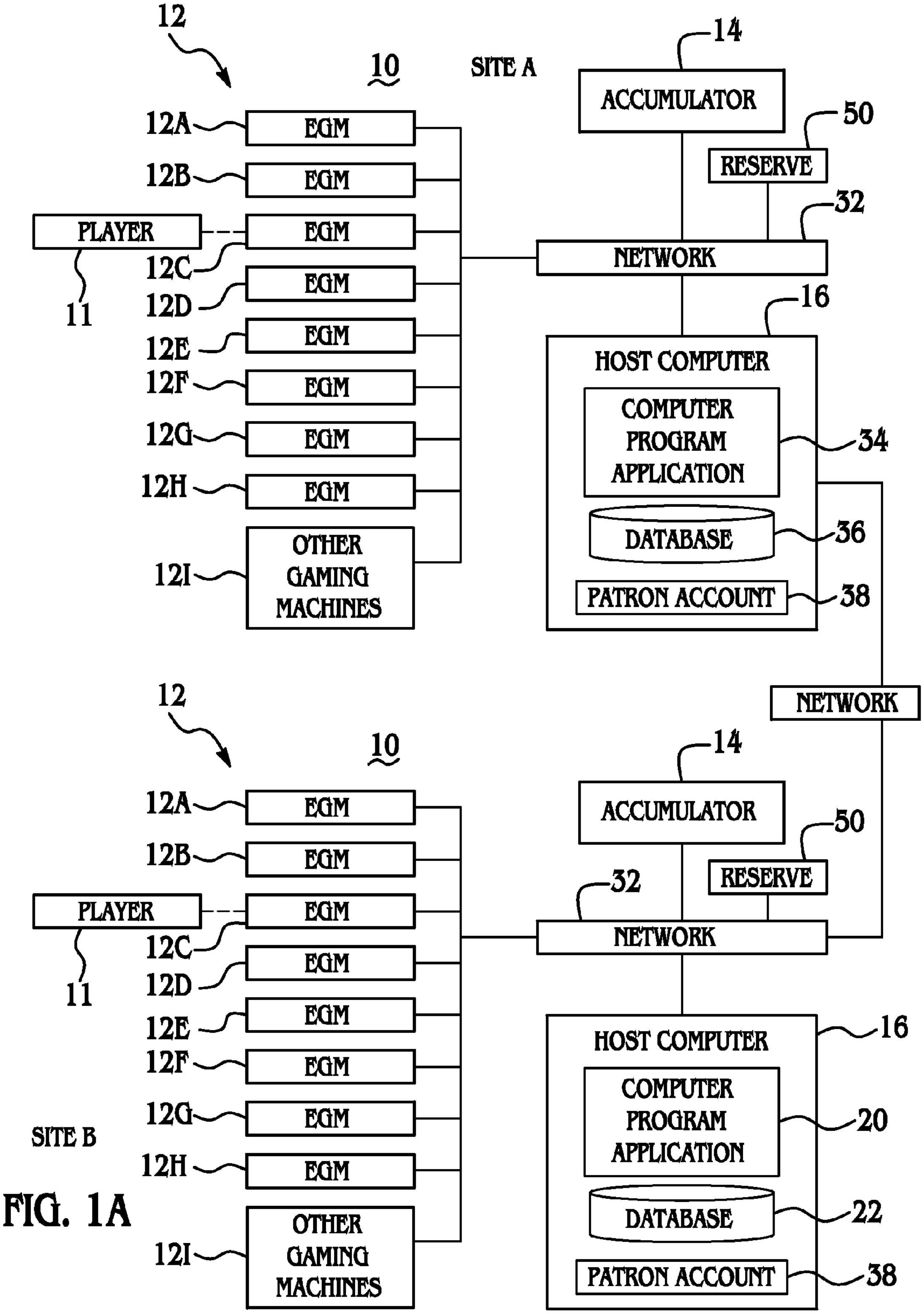
FIG. 1A is a block diagram of a multi-site system for allowing the player to interface with the gaming machine.
Figure 3:
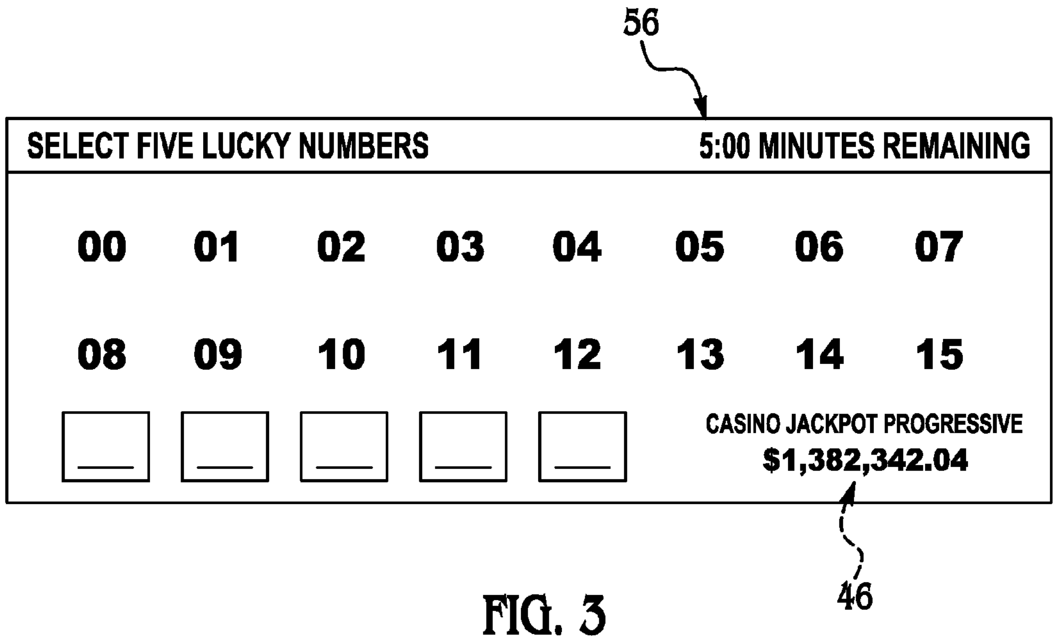
FIG. 3 is an illustration of an exemplary casino configured player tracking display.

Gaming machines 12 include, but are not limited to, electronic gaming machines 12 (EGM) (such as video slot, video poker machines, video arcade games, or slot machines with mechanical reels), virtual gaming machines 12, e.g., for online gaming, an interface to a table management system 10 (not shown) for table games, online bingo, online keno, point of sale terminals, online hotel folios, or any other device connected to the system 10. As shown, the system 10 includes a plurality of gaming machines 12. In the illustrated embodiments, eight electronic gaming machines 12A-12H are shown in FIGS. 1 and 1A. However, it should be noted that the present invention is not limited to any number or type of gaming machines 12. In one embodiment, the gaming machines 12 are organized into banks (not shown), with each bank containing a plurality of gaming machines 12. In another embodiment, the gaming machines 12 may enable the player a selection of a plurality of different denominational and games combinations at a plurality of different theoretical hold percentages. Other types of gaming machines 12 which may be included (see above) are indicated with reference number 12.

The gaming machines 12 allow each of the respective players 11 to initiate a session. The session is initiated when a respective player 11 logs onto one of the gaming machines 12 to play the primary game. Conducting a transaction includes playing a primary game, such as a slot game, a table game, use of a point of sale terminal, logging onto a kiosk to check a credit balance, etc. The secondary game is initiated in response to a predetermined trigger while the respective player 11 is logged onto the gaming machine 12 to play the primary game (as described in more detail below). Therefore, only players 11 in the current session, currently playing or currently using the gaming machine 12, i.e., in a "session" where each player starts/ends their own session, are eligible for the secondary game. While the discussion below focuses on the player 11 or patron playing the primary game, contributions and/or play of the secondary game may occur during other types of sessions at any type of gamine machine 12.

Figure 2:
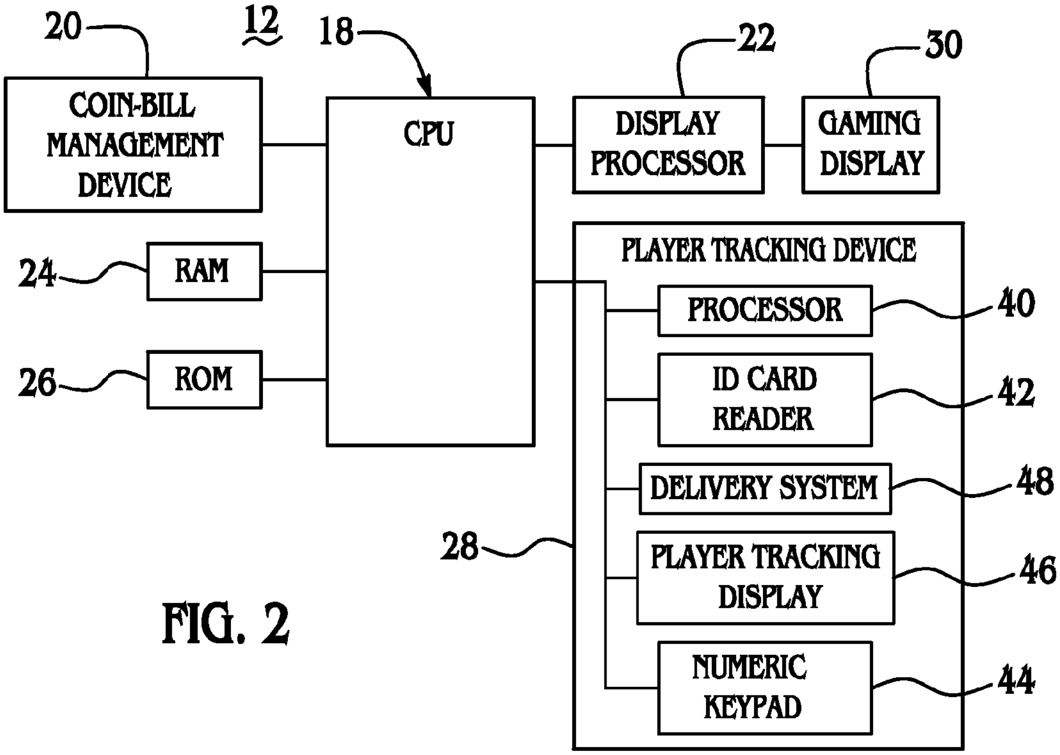
FIG. 2 is a block diagram of the gaming machine and a player tracking device.

In general, the gaming machines 12 are playable by a player 11. The player 11 selects one of the gaming machines 12C to play, potentially selects the play denomination or game within the multi-gaming machine and inserts a coin, cash, credit, coupon, player tracking card (not shown), etc. into the chosen gaming machine 12C. Generally, the gaming machines 12C have an associated number of credits or coins required in order to play. In the case of video slot or poker games, the game is played and an award in the form of credits may be awarded to the player 11 based on a pay table associated with the gaming machine 12. Referring to FIG. 2, a block diagram of a suitable gaming machine 12C is shown. The gaming machine 12C comprises a game controller, or central processing unit 18 (CPU), a coin-bill management device 20, a display processor 22, a RAM 24 (generally provided as a memory device), and a ROM 26 (generally provided as an EPROM), and a player tracking device 28 (described in more detail below). The CPU 18 includes a microprocessor 40 unit and performs various calculations and motion control necessary for the progress of the game. The coin-bill management device 20 detects the insertion of the coins and/or the bills and performs a necessary process for managing the coins and the bills. The display processor 22 interprets commands issued from the CPU 18 and displays desirable images on a gaming display 30. The RAM 24 temporarily stores programs and data necessary for the progress of the game, and the ROM 26 stores, in advance, programs and data for controlling basic operation of the gaming machine 12C, such as the booting operation thereof, game code, and graphics.

Input to the gaming machine 12 is accomplished via mechanical switches, buttons, a touchscreen interface, player input sensing device (not shown), etc. Such gaming machines 12 are well known in the art and are therefore not further discussed.

Host Computers

The gaming machines 12 are connected via the network 32 to one or more host computers 16, which are generally located at a remote or central location, as shown in FIGS. 1 and 1A. The host computer 16 includes a computer program application 34 which maintains one or more databases 36. In one embodiment, the database(s) 36 are Oracle database(s). The computer program application 34 and the databases 36 are used to record, track, and report accounting information regarding the gaming machines 12 and the players 11 of the gaming machines 12. Additionally, the computer program application 34 and the databases 36 are used to maintain information related to player tracking accounts (as discussed in more detail below).

A patron account 38 is housed on the host computer 16 for storing patron information. The host computer 16 identifies the players 11 logged onto each of the gaming machines 12. A plurality of player tracking devices 28 are in communication with the host computer 16, generally via the network 32, for viewing patron information and identifying players 11 logged onto the gaming machines 12, as shown in FIG. 2. Generally, the player tracking device 28 is in communication with one of the gaming machines 12 such that each of the gaming machines 12 are in communication their own player tracking device 28, as shown in FIG. 2. Each player tracking device 28 is in communication with a respective gaming machine 12 and the host computer 16 for tracking the players 11 playing at the gaming machines 12. The player tracking device 28 includes a processor 40, a card reader 42 and/or a numeric keypad 44 or some other player identification method device capable of identifying the player, and a player tracking display 46. The player may insert a patron card or announce his or herself at the gaming machine 12 via a proximity card or other identification method associated with the player tracking device 28. The player tracking device 28 will communicate the patron information to the host computer 16. When the player 11 meets configured criteria for the secondary game, the host computer 16 will make available access to the list of available secondary games at the request of the player 11. The player 11 may be entered in the secondary game automatically with or without notification to the player 11. Alternatively, the player 11 may choose to enter one of the secondary games or decide not to enter any of the secondary games.

In one embodiment, the player tracking display 46 is a touch screen panel or player input sensing device and the numeric keypad 44 is implemented thereon. The player 11 may be identified by entry of the player tracking card into the card reader 42 and/or entry of a player identification number on the numeric key pad, or some other player identification method device capable of identifying the player. The player tracking device 28 may also be used to communicate information between the computer and the corresponding gaming machine 12C. Therefore, the player 11 is identified via the player tracking card and/or a player identification number which is entered into the player tracking device 28 at a respective gaming machine 12.

With reference to FIG. 2, in one aspect of the present invention, the player tracking device 28 provides an interface for interaction between the player 11 or other user (not shown), such as a slot employee or slot technician, and the host computer 16. As discussed above in one embodiment, the player tracking display 46 is a touch screen interface or player input sensing device which allows information to be displayed to the player 11 or user, as well as provide interactive buttons or menus for receiving input. Furthermore, the keypad may be implemented on the player tracking display 46 and displayed on the player tracking display 46 as appropriate or required. In one aspect of the present invention, the player tracking display 46 displays a bezel (not shown). Other information may be displayed within the bezel. In one embodiment, the bezel includes a modifiable parameter for indicating information, e.g., to a slot employee. The modifiable parameter may be color, but other parameters may be used. For example, the bezel may blink, change colors, or cycle in some other manner to convey information. In another aspect of the present invention, the player tracking device 28 allows the player 11 to interact with the player tracking system 10 to view information and to interact with the patron account 38.

In another aspect of the present invention, the player tracking device 28 allows the player 11 to interact with the secondary game. In this aspect of the invention, the player tracking device 28 includes a delivery system 48 for displaying the results of the secondary game on the player tracking display 46. In yet another aspect of the invention, the results of the secondary game are displayed on the gaming display 30.

Jackpot

The accumulator 14 is responsive to play at each of the gaming machines 12 by the players 11 and establishes one or more jackpot pools for awarding prizes or jackpots to the players 11. As stated earlier, the accumulator 14 is in communication with the host computer 16, over the network 32, and accumulates funds within the one or more jackpot pools, as shown in FIGS. 1 and 1A. Alternatively, the accumulator 14 is contained within the host computer 16. As yet another alternative, the accumulator 14 is contained within a separate bonus or progressive server (not shown). The host computer 16 tracks all relevant information related to the criteria for the jackpot automatically for all currently playing carded players 11. For example, a jackpot may be active between 9 PM and 1 AM. The host computer 16 may randomly determine the time of the secondary game. To be eligible for the secondary game, and the jackpot, all carded players 11 who previously met the specified criteria and selected to enter the secondary game or all carded and/or non-carded players 11 currently playing the primary game are eligible.

Funds are contributed to the jackpot pool(s) by the players 11 through their playing of the primary game on the gaming machines 12. Therefore, funds are added to the jackpot pool(s) as a function of a wager by each player 11 at the gaming machines 12. The prizes for the jackpot, which are established by the funds in the jackpot pool(s) within the accumulator 14, may be cash, credits, coins, or any other prize known to those skilled in the art. The funds are added to the jackpot pool(s) as a function of a wager by each player 11 multiplied by a predetermined percentage. In another embodiment, the funds are added to the jackpot pool(s) as a function of a wager by each player 11 multiplied by a predetermined percentage. For example, the percentage is set by the casino for all gaming machines 12 or may be a percentage based on the type of gaming machine 12. Additionally, the predetermined percentage may be based on the theoretical hold or win of a gaming machine 12 or the profit (e.g., of a point of sale, table games, Keno, Bingo, Sports Book or other casino revenue sources connected to the system). As it pertains to the theoretical hold or win of a gaming machine, the predetermined percentage of gaming machines capable of a plurality of theoretical hold or win is the actual percentage of the active game the player is playing. In yet another embodiment, the funds are added to the jackpot pool(s) as a function of a historical average of wagers by each player 11 multiplied by a predetermined percentage or a theoretical hold. The historical average and/or purchase may be a casino (single or multiple property) value and may be based on one or more of the following: casino, property, game or machine type, game or machine manufacturer, denomination of the game, player 11, player category or group, or any other criteria. Alternatively, the funds are added to the jackpot pool(s) as a set amount of a wager by each player 11. In yet another alternative embodiment, the funds are added to the jackpot as a function of a wager by each player 11 multiplied by a percentage of a theoretical hold. In another embodiment, the funds are added to the jackpot pool(s) by adding an amount of the wager by the player 11 as a function of a player rating. The contributions made by the player 11 may be determined at the time each wager is made or may be determined periodically based on past wagers. For example, the system 10 may determine and store information related to a player's play. Such information, generally referred to as a player's "rating" may include information such as total wagers, average wager, total won, etc. The player's rating may be updated periodically, e.g., every 5 or 15 minutes while the player 11 is playing or when the player 11 stops playing (indicated for example by removal of their player tracking card or expiration of a predetermined period of time after the last play).

Figure 5:
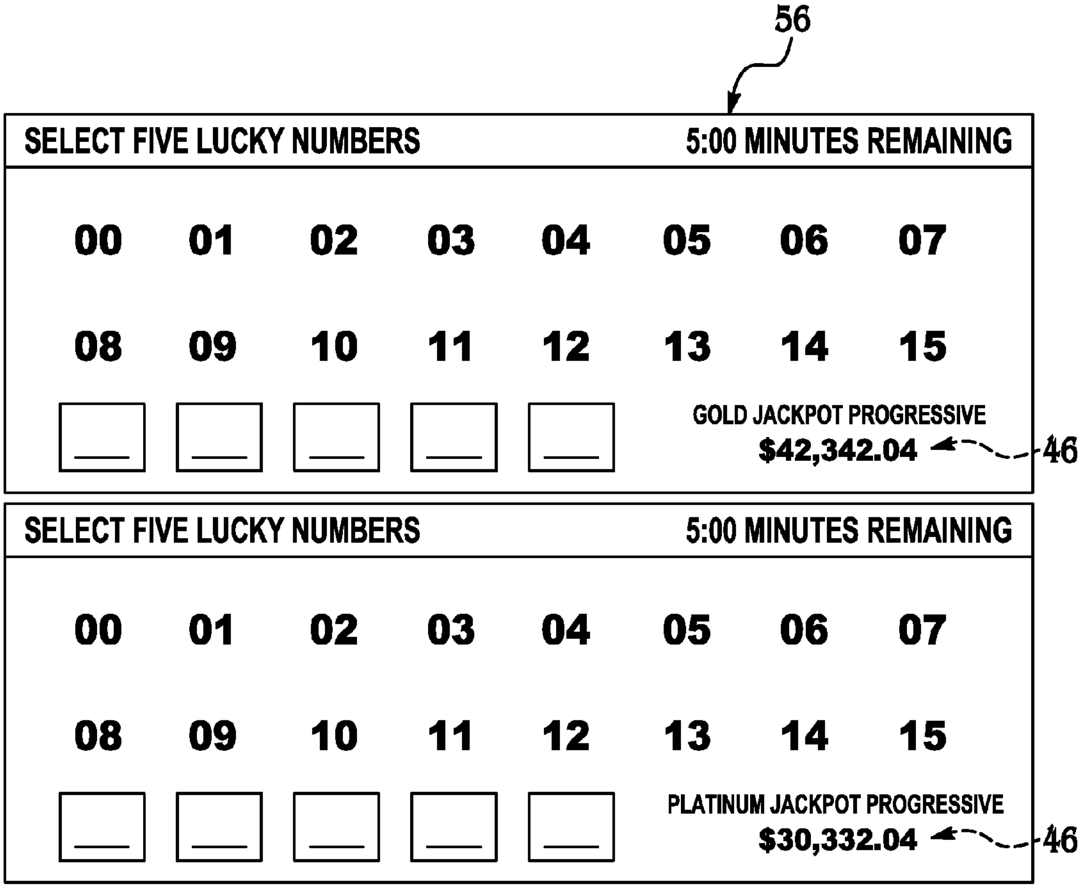
FIG. 5 is an illustration of the casino configured player tracking display where the secondary game is configured based on player club membership.

In one embodiment, a primary jackpot pool is established to award prizes to the player(s). In one embodiment, the funds are only contributed to the jackpot pool(s) in the accumulator 14 by transactions by a carded player 11 during a session initiated when the player 11 or patron logs onto the gaming machine 12. If the player 11 utilizes their player tracking card to identify them while playing the gaming machine 12 or making a purchase, it is referred to as a "carded" play or a "carded" purchase. In another embodiment, carded and non-carded play and/or purchases and/or other transaction will result in a contribution to the accumulator 14. In another aspect of the invention, a player's club membership may determine which casino accumulator 14 is credited with the funds or previously disclosed methodology for incrementing the jackpot pool(s), as illustrated in FIG. 5.

While the players 11 are playing the primary game and/or the secondary game and/or performing some other transaction, the total amount of prizes available to be won from the jackpot are displayed on the player tracking display 46 of the player tracking device 28. Alternatively, the total amount of prizes available to be won may be displayed on a screen separate from the player tracking device 28, e.g., a screen displayed to the entire casino, the gaming display 30, etc.

Additionally, a reserve 50 is responsive to play at each of the gaming machines 12 by the players 11. The reserve 50 establishes one or more secondary or reserve jackpot pools for transferring funds from the secondary jackpots to the primary jackpot pool in the accumulator 14 to reestablish or re-fund the primary jackpot. Funds are contributed to the secondary jackpots by the players 11. Generally, a portion of the player's wager is taken and placed into the reserve 50 as a function of the wager by the player 11. The funds within the reserve 50 are generally not available to the players 11 for viewing. Therefore, when the player(s) is awarded a prize from the jackpot, funds are taken from the accumulator 14 to award the player 11. To quickly replenish, or at least reestablish a portion of the funds in the accumulator 14, funds are transferred from the reserve 50 to the accumulator 14 such that there is always some jackpot pool(s) available to the players 11 playing the secondary game. Likewise, if there is no winner of the secondary game, the jackpot continues to build. In another aspect of the secondary game, each secondary game must result in at least one winner.

Figure 6:
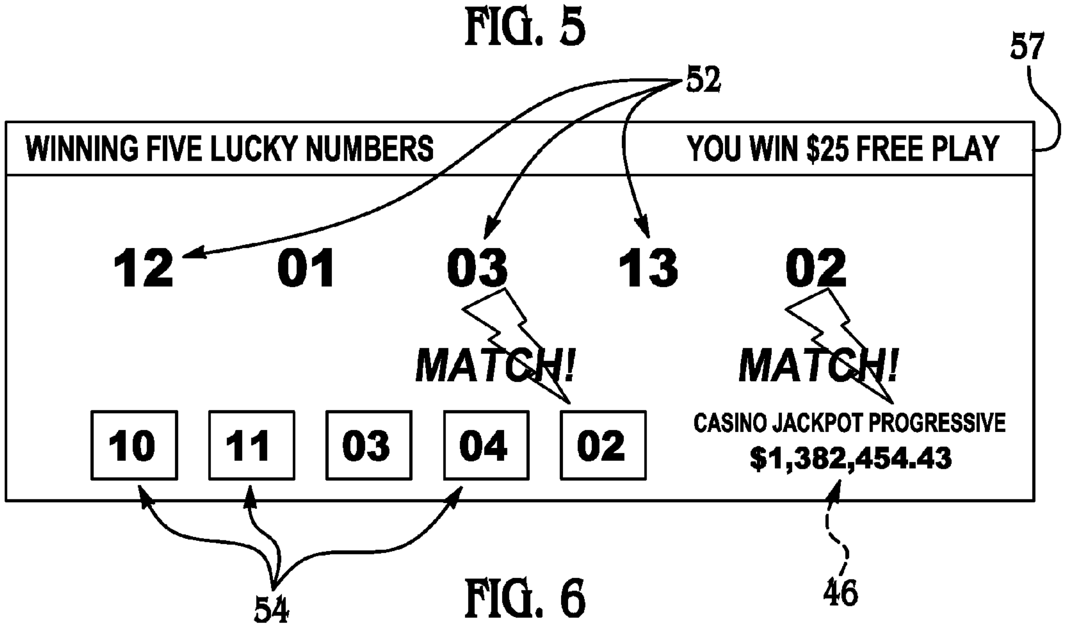
FIG. 6 is an illustration of consolation awards for players that match some but not all of a match set of symbols.
Figure 7:
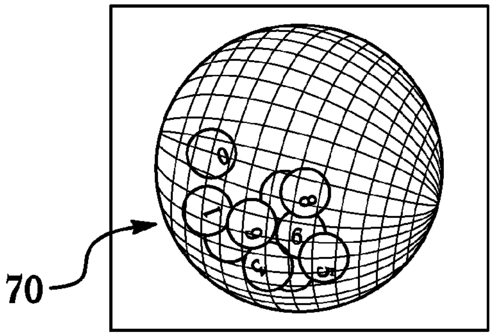
FIG. 7 is an illustration of a graphic used in a secondary game, according to an embodiment of the present invention.
Figure 8:
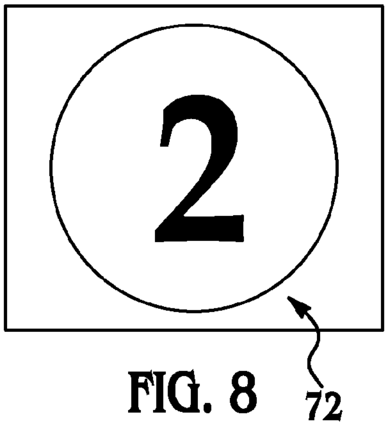
FIG. 8 is an illustration of a second graphic used in a secondary game, according to an embodiment of the present invention.
Figure 9:
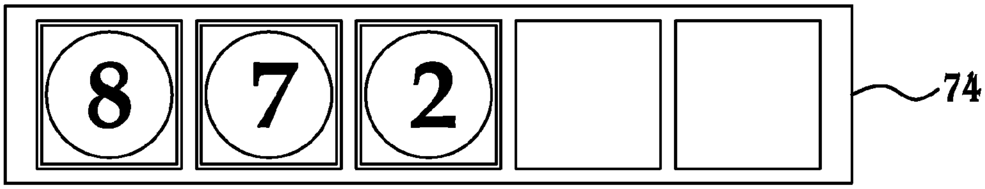
FIG. 9 is an illustration of a third graphic used in a secondary game, according to an embodiment of the present invention; and, FIG. 10 is an illustration of a fourth graphic used in a secondary game, according to an embodiment of the present invention.
Figure 10:
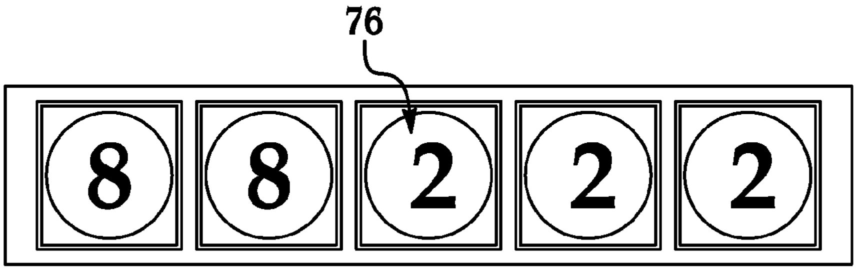

In another embodiment, only the jackpot is accumulated and awarded from the accumulator 14. All non-jackpot prizes are awarded from the reserve 50. As illustrated in FIG. 5 the accumulator 14 may be simultaneously accumulating a plurality of jackpot pools 46. As illustrated in FIG. 6, the prizes associated with a instance of a jackpot 46, may be funded from the associated reserve 50.

Secondary Game

The secondary game is triggered in response to a predetermined trigger. Generally, the secondary game is a matching game or other lotto-based game. In one aspect of the invention, the secondary game is a pure luck-based game. In another aspect of the invention, where permitted, the secondary game may have some element, or perceived element, of skill. In a further aspect, the secondary-game may be presented to the player in the form of a bonus game animation with or without player interaction. In one embodiment, the bonus-game style secondary game prize amount is based upon the results of the matching game. In another embodiment, the bonus-game style secondary game prize amount may be a function of the matching game or random. For example, the bonus-game style secondary game may be an animation of a dog race where the winning dog and amount of the prize is predetermined based upon the results of the matching game. In another example, the bonus game style secondary game may be an animation of a slot reel that spins until the amount of the prize is the predetermined amount of the match game win. In a further example of the bonus-game style secondary game, the animation may present the player with a choice of coins or other symbols, require the player to select a coin or symbol; however, the winning amount is the predetermined amount of the match game win.

In an alternative embodiment, the secondary game is a pseudo-game. In other words, the winner is predetermined, e.g., via a random drawing. The presentation of the winner is presented as a secondary game. A system for holding such a random drawing and presenting as a pseudo-game is disclosed in commonly assigned U.S. patent application Ser. No. 11/276,312, filed Feb. 23, 2006, entitled "Gaming System and Method for Providing Entry into a Contest".

The predetermined trigger is based on predetermined criteria, which may be set or configured by an operator or casino. In one embodiment, the casino schedules the frequency of when the game is triggered. Here, the predetermined trigger is a predetermined time, a randomly determined time, a randomly determined time within a time range, etc. In one embodiment, the secondary game is triggered monthly such that a random amount of time between the last secondary game and at least the start of the next month has to occur before the secondary game is triggered. In another embodiment, the secondary game is triggered weekly such that a random amount of time between the last secondary game and at least the start of the next week has to occur before the secondary game is triggered. In yet another embodiment, the secondary game is triggered daily such that a random amount of time between the last secondary game and at least a 24-hours must occur before the secondary game is triggered. In another embodiment, the secondary game is triggered to occur multiple times a day. In another embodiment, although the exact time at which the secondary game will be triggered will be unknown to the player 11, the system 10 may provide an indication to the players 11 that the game will be played shortly or sometime in the very near future, e.g., indicating that the game will be played in the next hour. The indication may be scrolling text on the player tracking display 46 of the player tracking device 28, the gaming display 30 of the gaming machine 12, and/or any other type of screen known to those skilled in the art. Alternatively, there may be no indication to the players 11 at all.

The delivery system 48 displays a list of the secondary games which are available to the respective players 11 on the player tracking display 46 and/or the gaming display 30. Generally, the delivery system 48 displays the list prior to initiating the secondary game. This means that there may be more than one secondary game available to the players 11. The players 11 then select the desired secondary game from the list of the available secondary games. In an alternative aspect, the players 11 are not given a choice of secondary games and all players 11 play the same secondary game. Before the secondary game commences, the players 11 who are eligible to play the secondary game are identified. For example, in one embodiment, only the carded players 11 currently in a session are eligible to play the matching game. In another embodiment, both carded and non-carded players 11 are eligible to play the matching game. Generally, only players 11 in a session who meet the criteria of playing, making a purchase, and/or otherwise utilizing a gaming machine 12 at the time the secondary game is triggered are eligible for the secondary game. Other potential criteria which may be used to determine which players 11 are eligible include, but are not limited to: class of players 11 (e.g., all "platinum players"), devices or machines, level of play based on the gaming machine 12 or denomination, etc.

For the matching or lotto-based secondary game, a match set of symbols 52 are generated from a larger set of symbols. Generally, the match set of symbols 52 are generated by the host computer 16. The match set of symbols 52 are a quantity of symbols and may be numbers, letters, playing cards, card suits, (hearts, diamonds, clubs, spades), zodiac symbols, symbols associated with dice, graphics, any other type of character suitable for matching, or combinations thereof. The quantity of characters in the match set of symbols 52 are predefined by the casino staff or randomly set by the host computer 16, e.g., 5, 7, 11, or 21 symbols. This means that the quantity of characters in the match set of symbols 52 may be allowed to vary between matching games. Alternatively, the quantity of symbols are a fixed quantity of symbols for every matching game.

Figure 4:
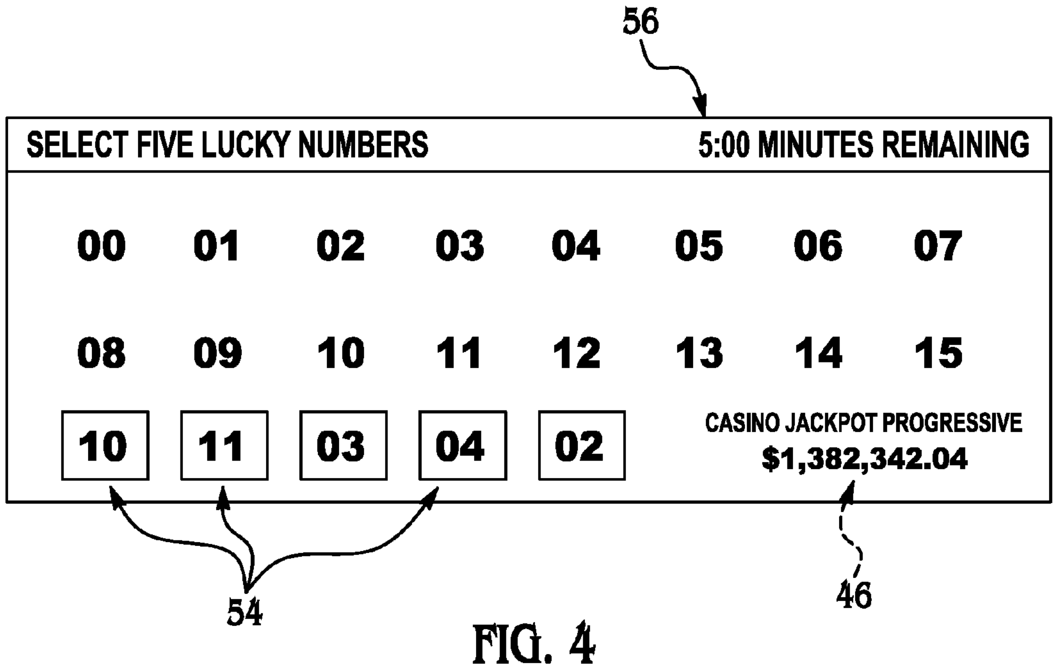
FIG. 4 is a second illustration of the casino configured player tracking display of FIG. 3.

For the matching or lotto-based secondary game, a selected set of symbols 54 is established for each player 11 from a larger set of symbols. The selected set of symbols 54 are a quantity of symbols and may be letters, playing cards, card suits, (hearts, diamonds, clubs, spades), zodiac symbols, symbols associated with dice, graphics, any other type of character suitable for matching, or combinations thereof. The quantity of characters in the selected set of symbols 54 are predefined by the casino staff or are randomly set by the host computer 16. This means that the quantity of characters in the selected set of symbols 54 may be allowed to vary between matching games. Alternatively, the quantity of symbols are a fixed quantity of symbols for every matching game. In another embodiment, the quantity of the selected set of symbols 54 is equal to the quantity of the match set of symbols 52. In yet another embodiment, the quantity of the selected set of symbols 54 is a number less than the quantity of the match set of symbols 52. To establish the selected set of symbols 54, the selected set of symbols 54 are randomly chosen by the host computer 16 for each player 11 when they establish a patron account on the host computer 16 and it becomes part of the patron account record 38. Alternatively, the player 11 is allowed to establish the selected set of symbols 54 on the host computer 16 by replacing the randomly selected set of symbols 54 with a set of symbols chosen by the player 11 as long as the secondary game has not already been started or actuated. In another aspect of the matching game, the player 11 is allowed to choose the selected set of symbols 54 from the time that they sign into the gaming machine 12 to establish the selected set of symbols 54 with the host computer 16. A time limit for allowing each player 11 to choose the selected set of symbols 54 may or may not be used. The time limit may be indicated on a timer 56 displayed on the player tracking display 46, as shown generally in FIGS. 3-6. In an alternative aspect of the matching game, a randomly selected set of symbols 54 are established for the player 11 when the time limit to choose the set of symbols has been attained, or times out, and the player 11 has failed to make a selection of the set of symbols. In another aspect of the matching game, the players 11 are given the option to elect between themselves choosing a selected set of symbols 54 and being assigned a randomly selected set of symbols 54 by the host computer 16. In another aspect of the matching game, players can view and modify their set of symbols which are stored in the host computer 16 at any time while the secondary game is not playing as illustrated in FIG. 4. The count-down timer 56 may or may not be displayed. In one embodiment, carded players may be allowed to pick their own symbols (or use previously picked symbols), while the symbols for un-carded are automatically, randomly chosen on their behalf.

In one aspect, the host computer 16 may be used to establish a matching rule for playing the matching game. The host computer 16 compares the match set of symbols 52 against each selected set of symbols 54. For each player 11 whose selected set of symbols 54 satisfies the matching rule, they are responsively awarded the prize from primary or secondary (reserve) jackpot pools. The matching rule is established to be that a quantity of symbols of the players 11 selected set of symbols 54 must match the match set of symbols 52. In one embodiment, all of the symbols of the players 11 selected set of symbols 54 must match the match set of symbols 52. In another embodiment, the matching rule is established to be that a quantity of the symbols, which are less than the entire number of the player's selected set of symbols 54, must match the match set of symbols 52. In yet another, the match set of symbols 52 are generated in a given order and the selected set of symbols 54 are selected in a given order. Here, the matching rule requires that a quantity of the player's selected set of symbols 54 must match the match set of symbols 52 in the order the match set of symbols 52 and/or the selected set of symbols 54 were generated.

As stated above in the illustrated embodiment, prizes are awarded from the jackpot or secondary (reserve) pool(s) to the players 11 satisfying the matching rule. For example, in one embodiment, if the players 11 match their entire selected set of symbols 54 against the match set of symbols 52, the player 11 wins the entire jackpot. If there is more than one player 11 who matches their entire selected set of symbols 54 against the match set of symbols 52, then the entire jackpot is split equally among those players 11. In another embodiment, the players 11 are awarded on a sliding scale based on the total number of their selected set of symbols 54 which match the match set of symbols 52. For example, four number matches pays $400, three number matches pays $200, two number matches pays $25, one number match pays $5, and zero number matches pays $0, as generally illustrated in FIG. 6. In another aspect of the invention, if the jackpot is won, then a secondary jackpot (or alternative award) may be shared by all other (or a subset of) the players 11 of the secondary game. In another embodiment, a predetermined, player selectable or random secondary game animation based on the number of matches may be presented to the player with a predetermined winning prize amount.

It should be noted that the casino may not want (or jurisdictional requirements may not allow) the jackpot to increase indefinitely. In these situations, the secondary game may be modified to increase the chances of winning by one or more of the following ways: removing the requirement that the symbols must match in the order they were selected; reducing the total number of the selected set of symbols 54 which must match; reducing the number of symbols selected or generated; randomly selecting an eligible player; etc. Additionally, it may be desirable to dynamically vary the odds of winning between the secondary games. In this aspect of the invention, the total number of symbols from which the player 11 selects their selected set of symbols 54 and the required number of symbols which must match may vary between secondary games.

The delivery system 48 is in communication with the host computer 16 for displaying the results of the matching game. In one aspect of the secondary game, the results are displayed by rotating, flipping, and/or scrolling a list of eligible players 11 for the matching game on the player tracking display 46 of the player tracking device 28 or the gaming display 30 before displaying or highlighting a winner (if any) of the matching game. The list of eligible players 11 includes all eligible players 11 at the beginning; however, the list may be pared down as players 11 are eliminated from the possibility of winning (based on the symbols generated). In another aspect of the present invention, the delivery system 48 may present the match set of symbols 52 and then sequentially list or shown the selected set of symbols 54. The display of the results includes displaying the selected set of symbols 54 and displaying the match set of symbols 52. In another aspect, the delivery system 48 displays the results of those players 11 whose selected set of symbols 54 satisfy the matching rule. The delivery system 48 is in communication with the host computer 16 for displaying at least one of the selected set of symbols 54 for each player 11 and the match set of symbols 52. The delivery system 48 may display a list of the players 11 playing the secondary game and display a winner on the list.

INDUSTRIAL APPLICABILITY

With specific reference to FIGS. 7-10, in one embodiment, multiple levels of the secondary game may be provided. For example, four levels of the secondary game may be provided. The levels may be designated by any distinguished type of designation, for example, numbers (1 through 4), colors (blue, green, red, yellow), or other suitable designation. Each level is customizable. Each may be set with a different triggering event and/or duration and/or contribution rate and/or payout table or schedule and/or other parameter. For example, the "blue" level could increment at 1% (times coin-in or other value) and include a $50 reward for a 3 out of 5 match. While the "green" level could increment at 0.5% (times coin-in or other value) and include a $20 award for a 3 out of 5 match. Additionally, the blue level may be triggered once per day, while the green level may be triggered twice a day.

One or more of the secondary levels may be limited to (or available to/at): a single machine or group of machines or game on a multiple game machine and/or type of patrons (e.g., carded vs. un-carded or gold vs. platinum).

With specific reference to FIGS. 7-10, in one embodiment, the secondary game is presented as a lottery or bingo type game. A graphic or animation 70 may be shown to represent the lottery or bingo balls or numbers from which the game results are drawn. A second graphic or animation 72 may be shown to illustrate the current ball or number just picked. The balls or numbers, i.e., game results, already picked and the patron's lucky numbers (which may be selected by the player or randomly determined) or selections may be displayed via third and fourth graphics 74, 76.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of operating a matching game for play by a plurality of players which is triggered while the plurality of players are performing a transaction, said method comprising the steps of:

receiving a request to initiate a transaction by a player via a gaming machine, the request including a unique player identification;

determining a player tracking account associated with the player in response to the request, the player tracking account including a first set of symbols selected from a predefined set of symbols;

generating a second set of symbols as a function of the first set of symbols;

initiating a matching game including randomly selecting a match set of symbols from the predefined set of symbols; and determining a number of matched symbols included in the match set of symbols and the second set of symbols and responsively providing an award to the player as a function of the number of matched symbols.

2. A method in accordance with claim 1, including the steps of:

allowing the player to select at least one replacement symbol from the predefined set of symbols; and generating the second set of symbols as a function of the first set of symbols and the selected replacement symbol.

3. A method in accordance with claim 1, including the step of providing at least one of a first award and a second award to the player as a function of the number of matched symbols.

4. A method in accordance with claim 3, including the steps of:

establishing a first jackpot pool associated with the first award, the first jackpot pool being funded with a first contribution amount; and establishing a second jackpot pool associated with the second award, the second jackpot pool being funded with a second contribution amount that is different from the first contribution amount.

5. A method in accordance with claim 4, including the steps of:

receiving a signal indicative of a wager being placed by the player via the gaming machine; and determining the first and the second contribution amounts as a function of the wager.

6. A method in accordance with claim 3, including the steps of:

providing the first award to the player if each symbol included in the second set of symbols matches each corresponding symbol included in the match set of symbols; and providing the second award to the player if at least one of the symbols included in the second set of symbols matches a corresponding symbol included in the match set of symbols.

7. A method in accordance with claim 1, including the steps of:

receiving a request from the player to establish a player tracking account;

identify a corresponding player tracking account associated with the player in response to the received request;

selecting a plurality of symbols from the predefined set of symbols; and generating the first set of symbols including the selected plurality of symbols.

8. A system for providing a matching game for play by a plurality of players, comprising:

a plurality of gaming machines for allowing the players to initiate a session; and a host computer coupled to each of the plurality of gaming machines, the host computer including a database and a processor, the processor programmed to:

receive a request to initiate a transaction by a player via at least one of the gaming machines, the request including a unique player identification;

determine a player tracking account associated with the player in response to the request, the player tracking account including a first set of symbols selected from a predefined set of symbols;

generate a second set of symbols as a function of the first set of symbols;

initiate a matching game including randomly selecting a match set of symbols from the predefined set of symbols; and determine a number of matched symbols included in the match set of symbols and the second set of symbols and responsively providing an award to the player as a function of the number of matched symbols.

9. A system in accordance with claim 8, the processor programmed to:

allow the player to select at least one replacement symbol from the predefined set of symbols; and generate the second set of symbols as a function of the first set of symbols and the selected replacement symbol.

10. A system in accordance with claim 8, the processor programmed to provide at least one of a first award and a second award to the player as a function of the number of matched symbols.

11. A system in accordance with claim 10, the processor programmed to:

establish a first jackpot pool associated with the first award, the first jackpot pool being funded with a first contribution amount; and establish a second jackpot pool associated with the second award, the second jackpot pool being funded with a second contribution amount that is different from the first contribution amount.

12. A system in accordance with claim 11, the processor programmed to:

receive a signal indicative of a wager being placed by the player via the gaming machine; and determine the first and the second contribution amounts as a function of the wager.

13. A system in accordance with claim 10, the processor programmed to:

provide the first award to the player if each symbol included in the second set of symbols matches each corresponding symbol included in the match set of symbols; and provide the second award to the player if at least one of the symbols included in the second set of symbols matches a corresponding symbol included in the match set of symbols.

14. A system in accordance with claim 8, the processor programmed to:

receive a request from the player to establish a player tracking account;

identify a corresponding player tracking account associated with the player in response to the received request;

select a plurality of symbols from the predefined set of symbols; and generate the first set of symbols including the selected plurality of symbols.

15. A player tracking system, comprising:

a host computer coupled to a plurality of gaming machines, the host computer including:

a database including a plurality of player tracking accounts; and a processor programmed to:

receive a request to initiate a transaction by a player via at least one of the gaming machines, the request including a unique player identification;

determine a player tracking account associated with the player in response to the request, the player tracking account including a first set of symbols selected from a predefined set of symbols;

generate a second set of symbols as a function of the first set of symbols;

initiate a matching game including randomly selecting a match set of symbols from the predefined set of symbols; and determine a number of matched symbols included in the match set of symbols and the second set of symbols and responsively providing an award to the player as a function of the number of matched symbols.

16. A player tracking system in accordance with claim 15, the processor programmed to:

allow the player to select at least one replacement symbol from the predefined set of symbols; and generate the second set of symbols as a function of the first set of symbols and the selected replacement symbol.

17. A player tracking system in accordance with claim 15, the processor programmed to provide at least one of a first award and a second award to the player as a function of the number of matched symbols.

18. A player tracking system in accordance with claim 17, the processor programmed to:

establish a first jackpot pool associated with the first award, the first jackpot pool being funded with a first contribution amount; and establish a second jackpot pool associated with the second award, the second jackpot pool being funded with a second contribution amount that is different from the first contribution amount.

19. A player tracking system in accordance with claim 17, the processor programmed to:

provide the first award to the player if each symbol included in the second set of symbols matches each corresponding symbol included in the match set of symbols; and provide the second award to the player if at least one of the symbols included in the second set of symbols matches a corresponding symbol included in the match set of symbols.

20. A player tracking system in accordance with claim 15, the processor programmed to:

receive a request from the player to establish a player tracking account;

identify a corresponding player tracking account associated with the player in response to the received request;

select a plurality of symbols from the predefined set of symbols; and generate the first set of symbols including the selected plurality of symbols.

* * * * *